United States Patent
Sun et al.

(10) Patent No.: US 12,074,796 B2
(45) Date of Patent: Aug. 27, 2024

(54) DATA PACKET ROUTING METHOD AND APPARATUS

(71) Applicant: HUAWEI TECHNOLOGIES CO., LTD., Guangdong (CN)

(72) Inventors: Fengxin Sun, Shenzhen (CN); Guanhua Zhuang, Nanjing (CN); Yuanwei Wang, Shenzhen (CN); Feng Li, Nanjing (CN); Xiaomin Yang, Nanjing (CN); Shuheng Gu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 460 days.

(21) Appl. No.: 17/380,383

(22) Filed: Jul. 20, 2021

(65) Prior Publication Data
US 2021/0352014 A1    Nov. 11, 2021

Related U.S. Application Data
(63) Continuation of application No. PCT/CN2019/129881, filed on Dec. 30, 2019.

(30) Foreign Application Priority Data
Jan. 22, 2019    (CN) .......................... 201910057402.8

(51) Int. Cl.
H04L 45/74    (2022.01)
H04L 45/00    (2022.01)

(52) U.S. Cl.
CPC .............. *H04L 45/74* (2013.01); *H04L 45/70* (2013.01)

(58) Field of Classification Search
None
See application file for complete search history.

(56) References Cited

U.S. PATENT DOCUMENTS

| | | | |
|---|---|---|---|
| 9,477,551 B1 * | 10/2016 | Piszczek | G06F 3/0685 |
| 2009/0109974 A1 * | 4/2009 | Shetty | H04L 49/3009 370/392 |

(Continued)

FOREIGN PATENT DOCUMENTS

| | | |
|---|---|---|
| CN | 101309201 A | 11/2008 |
| CN | 102136989 A | 7/2011 |

(Continued)

OTHER PUBLICATIONS

PCT International Search Report and Written Opinion issued in International Application No. PCT/CN2019/129881 on Mar. 13, 2020, 13 pages (with English translation).

(Continued)

*Primary Examiner* — Phirin Sam
(74) *Attorney, Agent, or Firm* — Fish & Richardson P.C.

(57) ABSTRACT

Examples in this disclosure relates to methods and apparatus for routing data packet. One example method includes receiving a data packet, determining a first computation task type corresponding to the data packet, determining, based on a pre-obtained first correspondence between the first computation task type, nodes, and a computing performance corresponding to each of the nodes, at least one of the nodes corresponding to the first computation task type and a first computing performance corresponding to the at least one of the nodes, determining a target node from the at least one of the nodes based on the first computing performance corresponding to the at least one of the nodes and a link status between a local node and each of the at least one of the nodes, determining an address of the target node as a destination address of the data packet, and forwarding the data packet based on the destination address.

20 Claims, 6 Drawing Sheets

(56) References Cited

U.S. PATENT DOCUMENTS

| | | | |
|---|---|---|---|
| 2012/0120808 A1 | 5/2012 | Nandagopal et al. | |
| 2013/0066951 A1* | 3/2013 | Agranat | H04L 67/1097 709/217 |
| 2014/0207950 A1 | 7/2014 | Badiee et al. | |
| 2017/0279734 A1* | 9/2017 | Goncalves | H04L 47/781 |
| 2018/0069780 A1 | 3/2018 | Dhanabalan | |
| 2020/0052997 A1* | 2/2020 | Ramanathan | H04L 69/22 |
| 2020/0186478 A1* | 6/2020 | Chou | H04L 47/724 |
| 2023/0114725 A1* | 4/2023 | Yang | G06N 3/084 712/220 |

FOREIGN PATENT DOCUMENTS

| | | |
|---|---|---|
| CN | 102439913 A | 5/2012 |
| CN | 103188152 A | 7/2013 |
| CN | 104348886 A | 2/2015 |
| CN | 104767682 A | 7/2015 |
| CN | 105141541 A | 12/2015 |
| CN | 106789661 A | 5/2017 |
| CN | 107087014 A | 8/2017 |
| CN | 107634872 A | 1/2018 |
| CN | 107846358 A | 3/2018 |

OTHER PUBLICATIONS

Extended European Search Report issued in European Application No. 19911896.9 on Jan. 19, 2022, 11 pages.

Hang et al., "A Dynamic Feedback-based Load Balancing Methodology," Journal of Changchun University of Science and Technology (Natural Science Edition), vol. 40, No. 6, Dec. 2017, 7 pages (with English abstract).

Jun et al., "Optimized QoS-supported algorithm of opportunistic routing in wireless Mesh network," Journal of National University of Defense Technology, vol. 39, No. 6, Dec. 2017, 9 pages (with English abstract).

Office Action issued in Chinese Application No. 201910057402.8 on Mar. 25, 2022, 13 pages (with English translation).

Office Action issued in Chinese Application No. 201910057402.8 on Aug. 31, 2022, 4 pages.

* cited by examiner

DATA PACKET ROUTING METHOD AND APPARATUS

CROSS-REFERENCE TO RELATED APPLICATIONS

This application is a continuation of International Application No. PCT/CN2019/129881, filed on Dec. 30, 2019, which claims priority to Chinese Patent Application No. 201910057402.8, filed on Jan. 22, 2019. The disclosures of the aforementioned applications are hereby incorporated by reference in their entireties.

TECHNICAL FIELD

This disclosure pertains to the field of network communications technologies, and in particular, to a data packet routing method and apparatus.

BACKGROUND

When receiving any data packet, a routing node may determine a next-hop routing node based on a current network status, and forward the data packet to the next-hop routing node. The data packet may carry information used to indicate target data that needs to be obtained from a data node, carry instant messaging information, carry information used to indicate a computation task of a target type that needs to be executed by a computing node (where a data packet carrying this type of information may be referred to as a data packet of a computation task type), or the like.

There may be a plurality of computing nodes that can execute a same type of computation task. Provided that a data packet of a computation task type is forwarded to any computing node that can execute a corresponding computation task, the computing node can execute the computation task and output a computation result. For example, a data packet of an image recognition type carries a to-be-recognized image. When receiving the data packet of the image recognition type, a computing node may obtain and recognize the to-be-recognized image, and return a recognition result to a task initiating node.

During implementation of this disclosure, the inventor finds that at least the following problem exists:

In a related technology, in a data packet routing process, how to forward the data packet is determined completely based on a current network status. For example, computing nodes that can execute a computation task A include a computing node B and a computing node C. It is determined, based on a current network status, to forward a data packet corresponding to the computation task A to the computing node C that corresponds to a path with an optimal current network status. However, in actual application, a computing node that corresponds to a path with an optimal current network status is not necessarily an optimal node for executing a computation task. If the foregoing situation arises, a node initiating a data packet of a computation task type needs to wait for a quite long time to obtain a desired result.

SUMMARY

To overcome the problem in the related technology, this disclosure provides the following technical solutions:

According to a first aspect, a data packet routing method is provided, where the method includes:
when a data packet of a computation task type is received, determining a first computation task type corresponding to the data packet;
determining, based on a pre-obtained first correspondence between a computation task type, other nodes, and computing performance, at least one other node corresponding to the first computation task type and computing performance corresponding to the at least one other node;
determining a target node from the at least one other node based on the computing performance corresponding to the at least one other node and based on a link status between a local node and each of the at least one other node; and
determining an address of the target node as a destination address of the data packet, and forwarding the data packet based on the destination address.

According to the method provided in this embodiment of this disclosure, in a data packet routing process, not only a current network status is considered, but also a target node is determined based on computing performance of each node that can execute a computation task indicated by a data packet of a computation task type. This can ensure that the target node can rapidly complete the computation task and feed back a computation result to a node initiating the data packet, thereby reducing a wait time of the node initiating the data packet.

In a possible implementation, the computing performance includes a computation delay, the link status includes a data packet round-trip delay, and the determining a target node from the at least one other node based on the computing performance corresponding to the at least one other node and based on a link status between a local node and each of the at least one other node includes:
for each of the other nodes, determining a sum of a computation delay corresponding to the other node and a data packet round-trip delay between the local node and the other node; and
determining, from the at least one other node, a node corresponding to a smallest sum as the target node.

The local node determines a node that can execute a computation task corresponding to each computation task type, a computation delay required by each node to execute the computation task of each computation task type, and a data packet round-trip delay between the node and the local node. For each of the other nodes, the sum of the computation delay corresponding to the other node and the data packet round-trip delay between the local node and the other node is determined, and the node corresponding to the smallest sum is determined from the at least one other node as the target node.

In a possible implementation, the method further includes:
when the local node is started, for each of the other nodes, sending a computation task type query request to the other node, receiving at least one computation task type returned by the other node, sending a computing performance query request corresponding to the at least one computation task type to the other node, and receiving computing performance that corresponds to the at least one computation task type returned by the other node; and
establishing the first correspondence between a computation task type, other nodes, and computing performance based on the at least one computation task type corresponding to each of the other nodes and based on the computing performance corresponding to the at least one computation task type.

Before the local node is started, the local node does not store the first correspondence, and the first correspondence needs to be established by the local node after the local node is started.

In a possible implementation, the other node and the local node belong to a same preset network area, the computing performance includes load information and a computation delay, and the receiving computing performance that corresponds to the at least one computation task type returned by the other node includes:

receiving current load information that corresponds to the at least one computation task type returned by the other node; and the method further includes:

determining, based on a pre-stored second correspondence between load information and a computation delay, a computation delay corresponding to the current load information as a computation delay corresponding to the at least one computation task type.

Historical data related to load information and a computation delay may be imported to and stored in the local node in advance. The local node may perform fitting on the historical data, to determine a relationship between the load information and the computation delay. In this way, when the current load information corresponding to the at least one computation task type is determined, the computation delay corresponding to the current load information can be determined, thereby determining the computation delay corresponding to the at least one computation task type.

In a possible implementation, the other node and the local node do not belong to a same preset network area, the computing performance includes a computation delay, and the receiving computing performance that corresponds to the at least one computation task type returned by the other node includes:

receiving a computation delay that corresponds to the at least one computation task type returned by the other node.

In a possible implementation, the first correspondence further stores quantities of updates of computing performance, and the method further includes:

when a computing performance query request sent by any one of the other nodes is received, obtaining a query computation task type and a corresponding quantity of updates that are carried in the computing performance query request, where the computing performance query request is used to indicate to query computing performance of another node belonging to a same preset network area as the local node;

determining, from the first correspondence, a quantity of updates of computing performance corresponding to the query computation task type; and if the determined quantity of updates is greater than the quantity of updates that is carried in the computing performance query request, sending the computing performance corresponding to the query computation task type and the determined quantity of updates to the any one of the other nodes.

When the local node is started, the first correspondence may be established preliminarily. A computation delay does not remain constant, but changes dynamically with time according to a specific situation. Therefore, the computation delay needs to be updated.

In a possible implementation, the method further includes:

each time when a target data packet whose destination address is another node belonging to a same preset network area as the local node is received, determining a second computation task type corresponding to the target data packet, and forwarding the target data packet to the another node belonging to the same preset network area as the local node;

when a computation result that corresponds to the target data packet and that is returned by the another node belonging to the same preset network area as the local node is received, determining a computation delay between a time point at which the target data packet is forwarded and a current time point, and determining the computation delay as computing performance corresponding to the second computation task type; and replacing, with the computing performance corresponding to the second computation task type, computing performance that is in the first correspondence and corresponds to the second computation task type that corresponds to the another node belonging to the same preset network area as the local node, and after the replacement, updating a quantity of updates of the computing performance in the first correspondence.

According to a second aspect, a data packet routing apparatus is provided, where the apparatus includes at least one module, and the at least one module is configured to implement the data packet routing method provided in the first aspect.

According to a third aspect, a node is provided, where the node includes a processor and a memory, the processor is configured to execute an instruction stored in the memory, and the processor executes the instruction to implement the data packet routing method provided in the first aspect.

According to a fourth aspect, a computer-readable storage medium is provided, including an instruction, where when the computer-readable storage medium is run on a node, the node is enabled to perform the method according to the first aspect.

According to a fifth aspect, a computer program product including an instruction is provided, where when the computer program product runs on a node, the node is enabled to perform the method according to the first aspect.

The technical solutions provided in the embodiments of this disclosure may have the following beneficial effects:

According to the method provided in the embodiments of this disclosure, in a data packet routing process, not only a current network status is considered, but also a target node is determined based on computing performance of each node that can execute a computation task indicated by a data packet of a computation task type. This can ensure that the target node can rapidly complete the computation task and feed back a computation result to a node initiating the data packet, thereby reducing a wait time of the node initiating the data packet.

It should be understood that the general descriptions above and the detailed descriptions below are only intended for illustrative and explanatory purposes, and do not limit this disclosure.

BRIEF DESCRIPTION OF DRAWINGS

The accompanying drawings herein are incorporated into the specification and constitute a part of the specification. The accompanying drawings show embodiments compliant with this disclosure and are used in combination with the specification to explain this disclosure. In the accompanying drawings.

The foregoing accompanying drawings show specific embodiments of this disclosure, and more detailed descriptions are provided in the following. The accompanying drawings and text descriptions are not intended to limit the scope of the idea of this disclosure in any manner, but are intended to describe the concept of this disclosure to a person skilled in the art with reference to particular embodiments.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with this disclosure. On the contrary, they are only examples of apparatuses and methods that are described in the appended claims in details and that are consistent with some aspects of this disclosure.

Figure 1:
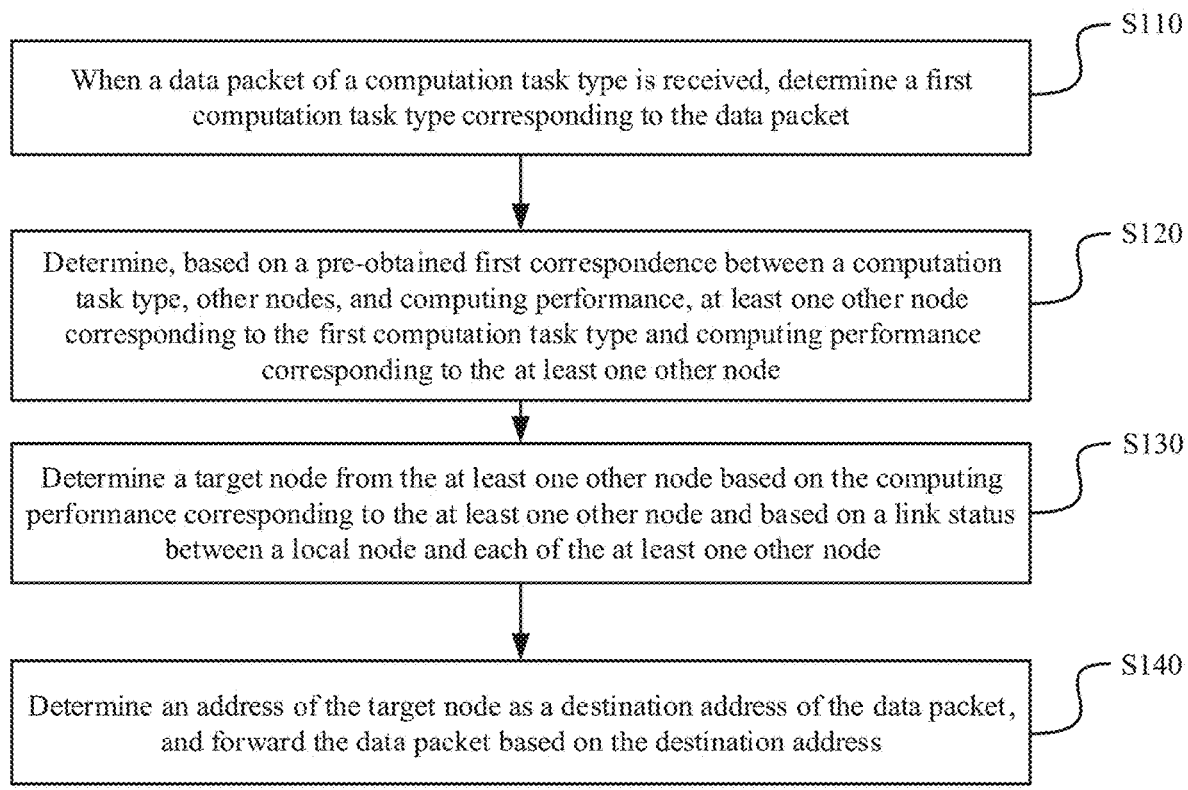
FIG. 1 is a schematic flowchart of a data packet routing method according to an example embodiment.

An example embodiment of this disclosure provides a data packet routing method. As shown in FIG. 1, a processing process of the method may include the following steps.

Step S110: When a data packet of a computation task type is received, determine a first computation task type corresponding to the data packet.

During implementation, when receiving a data packet, a local node may determine a task type corresponding to the received data packet. The data packet includes information used to indicate target data that needs to be obtained from a data node, instant messaging information, information used to indicate a computation task of a target type that needs to be executed by a computing node (where a data packet carrying this type of information may be referred to as a data packet of a computation task type), or the like.

When receiving the data packet of the computation task type, the local node may determine the first computation task type corresponding to the data packet. In actual application, when receiving the data packet, the local node may obtain an internet protocol address (Internet Protocol Address, IP) carried in a header of the data packet. Then, the local node may determine a type of the carried IP address. If the carried IP address is an IP address of any node, the data packet is forwarded based on the IP address of the any node. If the carried IP address corresponds to any computation task, it can be determined that the received data packet is a data packet of a computation task type.

There may be a plurality of types of computation tasks. Therefore, different computation tasks need to be distinguished by using computation task type identifiers. The local node may obtain a computation task type identifier carried in the header of the data packet, and determine a first computation task type corresponding to the data packet. It should be noted that the local node needs to run a new routing protocol, to obtain, according to the new routing protocol, the computation task type identifier carried in the header of the data packet; and route the data packet based on the computation task type identifier.

Step S120: Determine, based on a pre-obtained first correspondence between a computation task type, other nodes, and computing performance, at least one other node corresponding to the first computation task type and computing performance corresponding to the at least one other node.

During implementation, a new router entry including a computation task type and computing performance may be added. The first correspondence between a computation task type, other nodes, and computing performance may be established in the local node in advance: and the at least one other node corresponding to the first computation task type and the computing performance corresponding to the at least one other node may be determined based on the first correspondence.

Different computing nodes may execute one or more types of computation tasks, and different computing nodes may execute same or different computation tasks. Therefore, nodes that can execute a computation task of the first computation task type may be determined first, and then an optimal node is selected from the nodes that can execute the computation task of the first computation task type.

For example, if a user wants a cloud side to help recognize all persons in a target image, the user may send a data packet requesting to recognize all the persons in the target image. When receiving the data packet requesting to recognize all the persons in the target image, the local node may obtain a computation task type identifier from the data packet; and search, based on the computation task type identifier, for a node that can execute a computation task corresponding to the computation task type identifier, where the node includes a node A, a node B, and a node C. Then the local node may determine computing performance corresponding to each of the nodes. The computing performance may include parameter information, such as a computation delay, that can represent capabilities of different nodes in executing a computation task.

Step S130: Determine a target node from the at least one other node based on the computing performance corresponding to the at least one other node and based on a link status between the local node and each of the at least one other node.

During implementation, the router entry may further include link status corresponding to difference nodes, and the link status may include a data packet round-trip delay between the local node and another node. In actual application, the local node may determine the at least one other node corresponding to the first computation task type, thereby determining the link status between the local node and each of the at least one other node. The target node is determined from the at least one other node by comprehensively considering factors such as the computing performance corresponding to the at least one other node and the link status between the local node and each of the at least one other node.

Optionally, the computing performance includes a computation delay, the link status includes a data packet round-trip delay. The step S130 may include: for each of the other nodes, determining a sum of a computation delay corresponding to the other node and a data packet round-trip delay between the local node and the other node; and determining, from the al least one other node; a node corresponding to a smallest sum as the target node.

During implementation; as shown in Table 1, a correspondence between a computation task type, other nodes, computation latencies, and data packet round-trip latencies between the local node and the other nodes may be established in advance.

TABLE 1

| Computation task type identifier | Other node | Computation delay | Data packet round-trip delay |
|---|---|---|---|
| Computation task type 1 | Node A | Tc1 | Tn1 |
| | Node B | Tc2 | Tn2 |
| | Node C | Tc3 | Tn3 |
| Computation task type 2 | Node A | Tc4 | Tn4 |
| | Node D | Tc5 | Tn5 |

A node that can execute a computation task corresponding to each computation task type, a computation delay required by each node to execute the computation task of each computation task type, and a data packet round-trip delay between the node and the local node can be determined based on Table 1. For each of the other nodes, the sum of the computation delay corresponding to the other node and the data packet round-trip delay between the local node and the other node is determined, and the node corresponding to the smallest sum is determined from the at least one other node as the target node.

Figure 2:
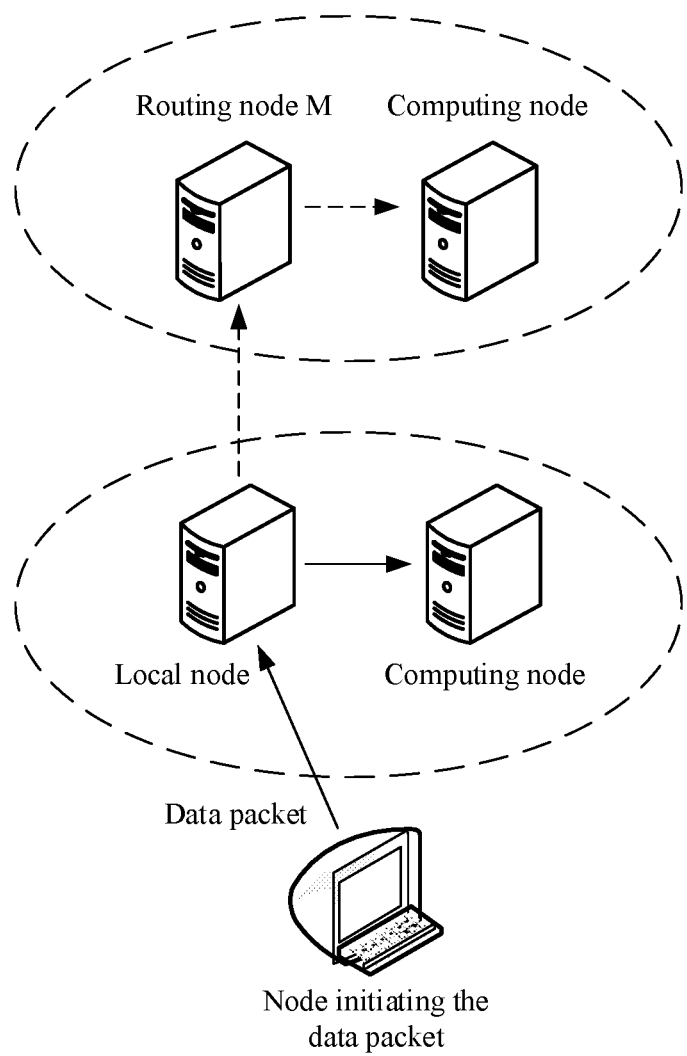
FIG. 2 is a schematic flowchart of a data packet routing method according to an example embodiment.

As shown in FIG. 2, a node corresponding to each computation task type may be a computing node belonging to a same preset network area as a local node, or may be a routing node that does not belong to the same preset network area as the local node. If a node corresponding to a computation task type is a routing node M that does not belong to the same preset network area as the local node, a data packet needs to be forwarded to the routing node M. Then the routing node M forwards the data packet to a computing node belonging to a same preset network area as the routing node M.

Step S140: Determine an address of the target node as a destination address of the data packet, and forward the data packet based on the destination address.

During implementation, after the target node is determined, the address of the target node may be queried, the address of the target node is determined as the destination address of the data packet, and the data packet is forwarded based on the destination address. After receiving a data packet of a computation task type whose destination address is the address of the target node, another routing node may forward the data packet based only on a network status, to finally forward the data packet to the target node.

After receiving the data packet of the computation task type whose destination address is the address of the target node, the target node may forward the data packet directly to a local computing node; or may re-determine, based on the method provided in this embodiment of this disclosure, whether a sum of a computation delay and a data packet round-trip delay that correspond to the local computing node is still the smallest, and if not, re-determine a target node.

The data packet is finally processed by the computing node, a processing result is returned to a routing lode belonging to a same preset network area as the computing node, and the routing node returns the processing result to a computation task initiating node along an original path.

Figure 3:
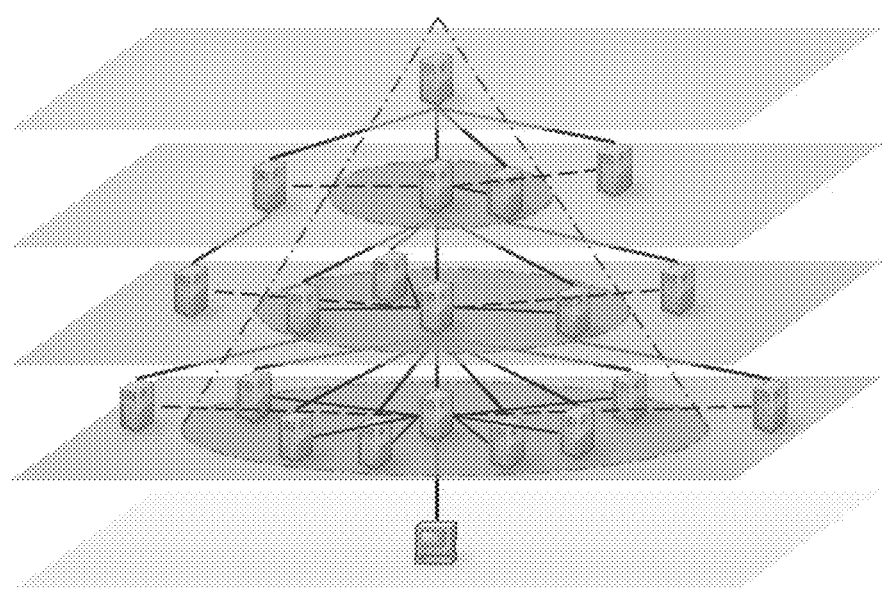
FIG. 3 is a schematic diagram of a network structure according to an example embodiment.

Before all routing nodes are started, area planning and level planning may be performed for these routing nodes. As shown in FIG. 3, routing nodes may be laid out in a distributed as well as centralized manner. There may be a hierarchical relationship between the routing nodes. An upper-level routing node is a central controller of a lower-level routing node, and the lower-level routing node may be controlled by the upper-level routing node. The lower-level routing node may obtain node information of routing nodes of a same level directly from the upper-level routing node, so that the lower-level routing node does not need to perform detection on the routing nodes of the same level one by one to obtain the node information. This can improve efficiency in obtaining the node information, and routing nodes of a same level can exchange routing information.

Routing nodes in a hierarchical relationship may be laid out in a centralized structure, and routing nodes of a same level may be laid out in a distributed structure. A quantity of routing nodes decreases as a level gets higher, and routing nodes converge as a level gets higher. Ultimately, a whole network including the routing nodes assumes a cone shape.

Each node, in the foregoing network, that executes the new routing protocol may function as the local node in the method provided in this embodiment of this disclosure. Before the local node is started, the local node does not store the first correspondence, and the first correspondence needs to be established by the local node after the local node is started.

Optionally, the method provided in this embodiment of this disclosure may further include: when the local node is started, for each of the other nodes, sending a computation task type query request to the other node, receiving at least one computation task type returned by the other node, sending a computing performance query request corresponding to the at least one computation task type to the other node, and receiving computing performance that corresponds to the at least one computation task type returned by the other node; and establishing the first correspondence between a computation task type, other nodes, and computing performance based on the at least one computation task type corresponding to each of the other nodes and based on the computing performance corresponding to the at least one computation task type.

During implementation, when the local node is started, an upper-level node of the local node may detect that the local node has been started, and the upper-level node may send, to the local node, node information of nodes of a same level as the local node, so that the local node may determine the nodes of the same level. The nodes of the same level include a computing node belonging to a same preset network area as the local node and a routing node that does not belong to the same preset network area as the local node. For example, the nodes of the same level are the node A, the node B, the node C, and the node D in Table 1.

The local node may establish Table 1 based on the nodes of the same level. In this case, Table 1 includes only other nodes, and initial values of other entries are all 0s. The local node may send the computation task type query request to the other node, receive the at least one computation task type returned by the other node, send the computing performance query request corresponding to the at least one computation task type to the other node, and receive computing performance that corresponds to the at least one computation task type returned by the other node. Then the local node may establish the first correspondence between a computation task type, other nodes, and computing performance based on the at least one computation task type corresponding to each of the other nodes and based on the computing performance corresponding to the at least one computation task type.

For a computing node belonging to the same preset network area as the local node, computing performance may include load information and a computation delay, and the step of receiving computing performance that corresponds to the at least one computation task type returned by the other node may specifically include: receiving current load information that corresponds to the at least one computation task type returned by the other node. Then the local node may determine, based on a pre-stored second correspondence between load information and a computation delay, a computation delay corresponding to the current load information as a computation delay corresponding to the at least one computation task type.

Historical data related to load information and a computation delay may be imported to and stored in the local node in advance. The local node may perform fitting on the historical data, to determine a relationship between the load information and the computation delay. In this way, when the current load information corresponding to the at least one computation task type is determined, the computation delay corresponding to the current load information can be determined, thereby determining the computation delay corresponding to the at least one computation task type.

A computation delay can directly reflect, in a simple and clear manner, a capability of a computing node in executing a computation task. Although there are many factors affecting a computing node in executing a computation task, all these factors can be ultimately reflected in a computation delay. A shorter computation delay proves that the computing node has a stronger capability in executing the computation task. Factors that may affect a computing node in executing a computation task include central processing unit (Central Processing Unit, CPU) performance, graphics processing unit (Graphics Processing Unit, GPU) performance, real-time load, and the like. In actual application, some computation tasks have a relatively high requirement on CPU performance, but have a low requirement on GPU performance. Some computation tasks have a relatively high requirement on GPU performance, but have a low requirement on CPU performance. For example, a computation task of an image recognition type has a relatively high requirement on GPU performance.

For a routing node that does not belong to the same preset network area as the local node, computing performance may include a computation delay, and the step of receiving computing performance that corresponds to the at least one computation task type returned by the other node may specifically include: receiving a computation delay that corresponds to the at least one computation task type returned by the other node.

Computing performance of a computing node N belonging to a same preset network area as the routing node M may be maintained by the routing node M. A routing node P that does not belong to the same preset network area as the routing node M maintains computing performance of a computing node Q belonging to a same preset network area as the routing node P. Therefore, the routing node M may detect the computing performance of the computing node Q directly from the routing node P.

A data packet round-trip delay between the local node and another node may be determined according to a preset period in an interactive manner by using a packet internet groper (Packet Internet Groper, PING) or the like.

In the foregoing manner, when the local node is started, the first correspondence may be established preliminarily. A computation delay does not remain constant, but changes dynamically with time according to a specific situation. Therefore, the computation delay needs to be updated.

Each time when a target data packet whose destination address is another node belonging to the same preset network area as the local node is received, a computing node belonging to the same preset network area as the local node determines a second computation task type corresponding to the target data packet, and forwards the target data packet to the another node belonging to the same preset network area as the local node; when a computation result that corresponds to the target data packet and that is returned by the another node belonging to the same preset network area as the local node is received, determines a computation delay between a time point at which the target data packet is forwarded and a current time point, and determines the computation delay as computing performance corresponding to the second computation task type; and replaces, with the computing performance corresponding to the second computation task type, computing performance that is in the first correspondence and corresponds to the second computation task type that corresponds to the another node belonging to the same preset network area as the local node, and after the replacement, updates a quantity of updates of the computing performance in the first correspondence.

The local node needs to forward a data packet of a computation task type to a computing node belonging to the same preset network area as the local node. When the computing node executes a computation task corresponding to the data packet of the computation task type, a current status of the computing node may be reflected. The local node may collect statistics on the status, and update computing performance corresponding to the computing node belonging to the same preset network area as the local node.

For example, when forwarding a data packet requesting to execute image recognition to the computing node belonging to the same preset network area as the local node, the local node may record a forwarding time point; and when receiving a recognition result returned by the computing node, may determine a computation delay between a time point at which the recognition result is returned and the forwarding time point, thereby determining a time required by the current computing node to execute a computation task of image recognition. The first correspondence further stores quantities of updates of computing performance. Each time when the local node updates a computation delay of a computing node belonging to the same preset network area as the local node, a quantity of updates may increase by 1. An initial value of a quantity of updates may be set to 0. Table 2 shows a correspondence between a computation task type, other nodes, computation latencies, data packet round-trip latencies between the local node and the other nodes, and quantities of updates.

TABLE 2

| Computation task type identifier | Other node | Computation delay | Data packet round-trip delay | Quantity of updates |
|---|---|---|---|---|
| Computation task type 1 | Node A | Tc1 | Tn1 | S1 |
| | Node B | Tc2 | Tn2 | S2 |
| | Node C | Tc3 | Tn3 | S3 |
| Computation task type 2 | Node A | Tc4 | Tn4 | S4 |
| | Node D | Tc5 | Tn5 | S5 |

For a routing node that does not belong to the same preset network area as the local node, the local node may send a detection packet (which may also be referred to as a computing performance query request) to the routing node, to obtain computing performance that is of a node and that needs to be updated. The first correspondence further stores quantities of updates of computing performance. The method provided in this embodiment of this disclosure may further include: when a computing performance query request sent by any one of the other nodes is received, obtaining a query computation task type and a corresponding quantity of updates that are carried in the computing performance query request, where the computing performance query request is used to indicate to query computing performance of another node belonging to a same preset network area as the local node; determining, from the first correspondence, a quantity of updates of computing performance corresponding to the query computation task type; and if the determined quantity of updates is greater than the quantity of updates that is carried in the computing performance query request, sending the computing performance corresponding to the query computation task type and the determined quantity of updates to the any one of the other nodes.

Figure 4:
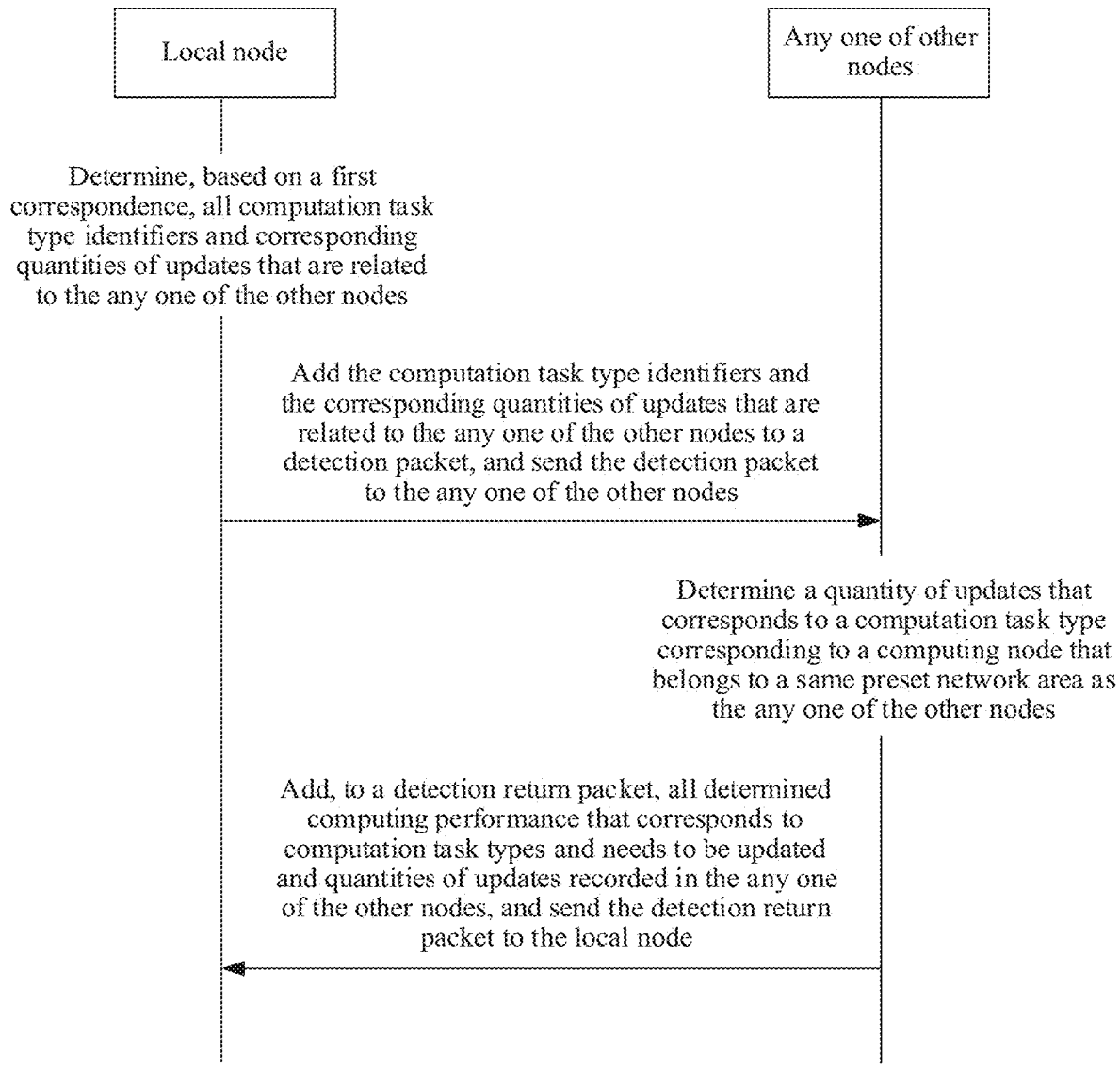
FIG. 4 is a schematic flowchart of a data packet routing method according to an example embodiment.

As shown in FIG. 4, if a current local node needs to update computing performance of any one of other nodes, the current local node may first determine, based on a first correspondence, all computation task type identifiers and corresponding quantities of updates that are related to the any one of the other nodes: and add the computation task type identifiers and the corresponding quantities of updates that are related to the any one of the other nodes to a detection packet, and send the detection packet to the any one of the other nodes.

After receiving, the detection packet sent by the local node, the any one of the other nodes determines a quantity of updates that corresponds to a computation task type corresponding to a computing node belonging to a same preset network area as the any one of the other nodes. If the determined quantity of updates is greater than a quantity of updates that is carried in the detection packet, it is determined that computing performance corresponding to the corresponding computation task type needs to be updated. The any one of the other nodes adds, to a detection return packet, all determined computing performance that corresponds to computation task types and that needs to be updated and quantities of updates recorded in the any one of the other nodes, and sends the detection return packet to the local node. It should be noted that if a target computation task type in the any one of the other nodes is not recorded in the first correspondence in the local node, the target computation task type also needs to be sent to the local node, so that the local node adds a record about the target computation task type.

Table 3 shows a correspondence between a computation task type, other nodes, computation latencies, data packet round-trip latencies between the local node and the other nodes, and quantities of updates.

TABLE 3

| Computation task type identifier | Other node | Computation delay (unit: ms) | Data packet round-trip delay (unit: ms) | Quantity of updates |
|---|---|---|---|---|
| Computation task type 1 | Node local | 1 | 60 | 70 |
| | Node 2 | 20 | 30 | 128 |
| | Node 3 | 7 | 35 | 61 |
| | Node 4 | 12 | 50 | 1071 |

TABLE 3-continued

| Computation task type identifier | Other node | Computation delay (unit: ms) | Data packet round-trip delay (unit: ms) | Quantity of updates |
|---|---|---|---|---|
| Computation task type 2 | Node local | 1 | 30 | 55 |
| | Node 2 | 20 | 20 | 316 |
| | Node 3 | 7 | 29 | 97 |

Figure 5:
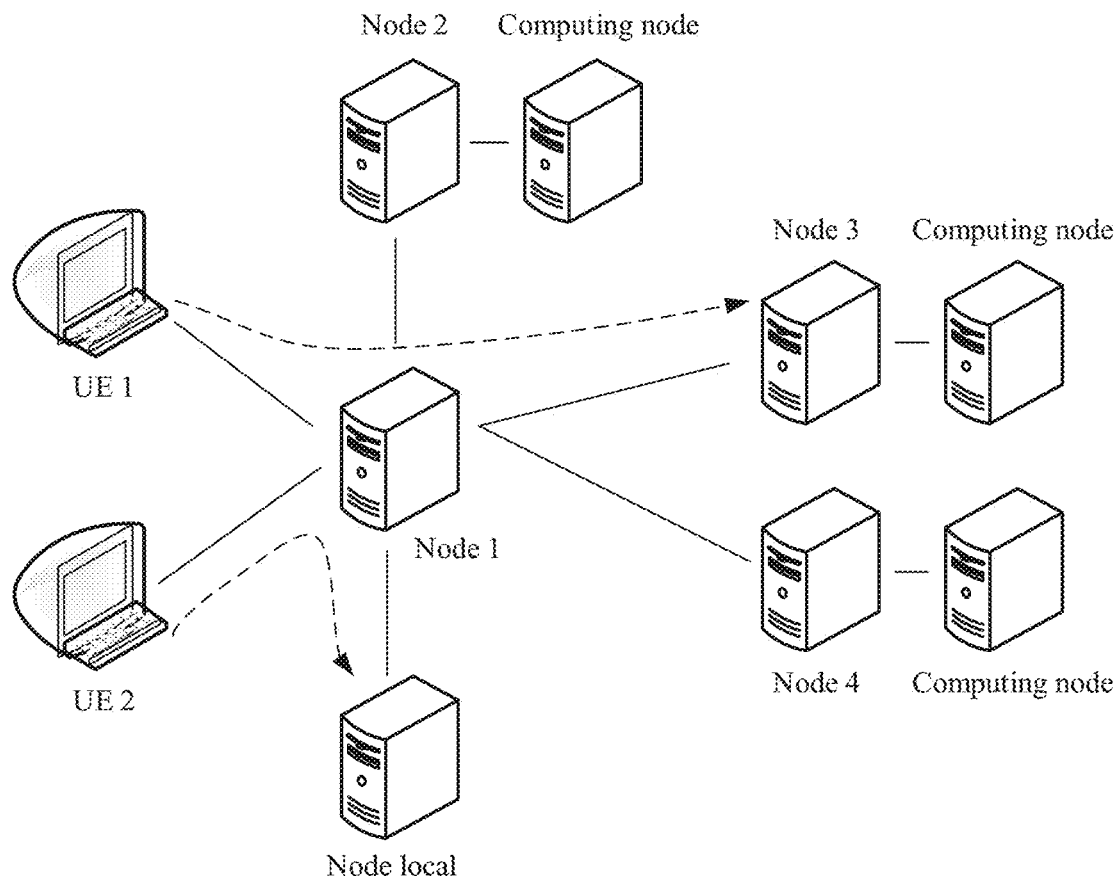
FIG. 5 is a schematic flowchart of a data packet routing method according to an example embodiment.

As shown in FIG. 5, when user equipment (User Equipment, UE) such as UE 1 initiates a data packet of a computation task type 1, the data packet arrives at a node 1 (a local node). The node 1 serves as a management node and routes the data packet. The node 1 looks up in Table 3 and determines that nodes that can execute a computation task corresponding to the computation task type 1 include a node local, a node 2, a node 3, and a node 4. A sum of a computation delay and a data packet round-trip delay of each node is calculated, and it is discovered that the node 3 corresponds to a smallest sum. The node 1 may forward the data packet to the node 3.

When UE 2 initiates a data packet of a computation task type 2, the data packet arrives at the node 1. The node 1 looks up in Table 3 and determines that nodes that can execute a computation task corresponding to the computation task type 2 include a node local, a node 2, and a node 3. A sum of a computation delay and a data packet round-trip delay of each node is calculated, and it is discovered that the node local corresponds to a smallest sum. The node 1 may forward the data packet to the node local.

After a period of time, when the UE 1 initiates a data packet of the computation task type 1 again, the data packet arrives at the node 1. At this time, the node 3 bears relatively heavy load, and a computation delay is increased to 50 ms. Therefore, this time, a sum corresponding to the node 2 is the smallest, and the node 1 may forward the data packet to the node 2.

According to the method provided in this embodiment of this disclosure, in a data packet routing process, not only a current network status is considered, but also a target node is determined based on computing performance of each node that can execute a computation task indicated by a data packet of a computation task type. This can ensure that the target node can rapidly complete the computation task and feed back a computation result to a node initiating the data packet, thereby reducing a wait time of the node initiating the data packet.

Figure 6:
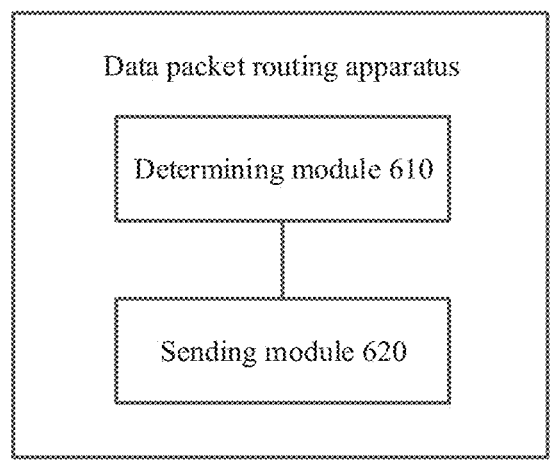
FIG. 6 is a schematic diagram of a structure of a data packet routing apparatus according to an example embodiment.

Another example embodiment of this disclosure provides a data packet routing apparatus. As shown in FIG. 6, the apparatus includes a determining module 610 and a sending module 620.

The determining module 610 is configured to: when a data packet of a computation task type is received, determine a first computation task type corresponding to the data packet; determine, based on a pre-obtained first correspondence between a computation task type, other nodes, and computing performance, at least one other node corresponding to the first computation task type and computing performance corresponding to the at least one other node, and determine a target node from the at least one other node based on the computing performance corresponding to the at least one other node and based on a link status between a local node and each of the at least one other node. The determining module 610 may specifically implement the determining functions in the foregoing steps S110 to S130 and implement other implicit steps.

The sending module 620 is configured to determine an address of the target node as a destination address of the data packet, and forward the data packet based on the destination address. The sending module 620 may specifically implement the sending function in the foregoing step S140 and implement other implicit steps.

Optionally, the computing performance includes a computation delay, the link status includes a data packet round-trip delay, and the determining module 610 is configured to:
  for each of the other nodes, determine a sum of a computation delay corresponding to the other node and a data packet round-trip delay between the local node and the other node: and
  determine, from the at least one other node, a node corresponding to a smallest sum as the target node.

Optionally, the apparatus further includes:
  a receiving module, configured to: when the local node is started, for each of the other nodes, send a computation task type query request to the other node, receive at least one computation task type returned by the other node, send a computing performance query request corresponding to the at least one computation task type to the other node, and receive computing performance that corresponds to the at least one computation task type returned by the other node; and
  an establishment module, configured to establish the first correspondence between a computation task type; other nodes, and computing performance based on the at least one computation task type corresponding to each of the other nodes and based on the computing performance corresponding to the at least one computation task type.

Optionally, the other node and the local node belong to a same preset network area, the computing performance includes load information and a computation delay, and the receiving module is configured to receive current load information that corresponds to the at least one computation task type returned by the other node; and
  the determining module 610 is further configured to determine, based on a pre-stored second correspondence between load information and a computation delay, a computation delay corresponding to the current load information as a computation delay corresponding to the at least one computation task type.

Optionally, the other node and the local node do not belong to a same preset network area, the computing performance includes a computation delay, and the receiving module is configured to:
  receive a computation delay that corresponds to the at least one computation task type returned by the other node.

Optionally, the first correspondence further stores quantities of updates of computing performance, and the apparatus further includes:
  an obtaining module, configured to: when a computing performance query request sent by any one of the other nodes is received, obtain a query computation task type and a corresponding quantity of updates that are carried in the computing performance query request, where the computing performance query request is used to indicate to query computing performance of another node belonging to a same preset network area as the local node;
  the determining module 610 is further configured to determine, from the first correspondence, a quantity of updates of computing performance corresponding to the query computation task type; and the sending module 620 is further configured to: if the determined quantity of updates is greater than the quantity of updates that is carried in the computing performance query request, send the computing performance corresponding to the query computation task type and the determined quantity of updates to the any one of the other nodes.

Optionally, the determining module 610 is further configured to: each time when a target data packet whose destination address is another node belonging to a same preset network area as the local node is received, determine a second computation task type corresponding to the target data packet, and forward the target data packet to the another node belonging to the same preset network area as the local node; and when a computation result that corresponds to the target data packet and that is returned by the another node belonging to the same preset network area as the local node is received, determine a computation delay between a time point at which the target data packet is forwarded and a current time point, and determine the computation delay as computing performance corresponding to the second computation task type; and
  the apparatus further includes:
    an updating module, configured to replace, with the computing performance corresponding to the second computation task type, computing performance that is in the first correspondence and corresponds to the second computation task type that corresponds to the another node belonging to the same preset network area as the local node, and after the replacement, update a quantity of updates of the computing performance in the first correspondence.

It should be noted that the foregoing determining module 610 and sending module 620 may be implemented by a processor, or implemented by a processor in combination with a memory and a transceiver.

According to the apparatus provided in this embodiment of this disclosure, in a data packet routing process, not only a current network status is considered, but also a target node is determined based on computing performance of each node that can execute a computation task indicated by a data packet of a computation task type. This can ensure that the target node can rapidly complete the computation task and feed back a computation result to a node initiating the data packet, thereby reducing a wait time of the node initiating the data packet.

It may be noted that when the data packet routing apparatus provided by the foregoing embodiment routes a data packet, only division of the foregoing function modules is taken as an example for illustration. In actual application, the foregoing functions can be allocated to different function modules and implemented according to a requirement, in other words, an inner structure of a node is divided into different function modules to implement all or some of the functions described above. In addition, the data packet routing apparatus provided in the foregoing embodiment and the embodiment of the data packet routing method are based on a same concept. For a specific implementation process of the apparatus, refer to the method embodiment. Details are not described herein again.

Figure 7:
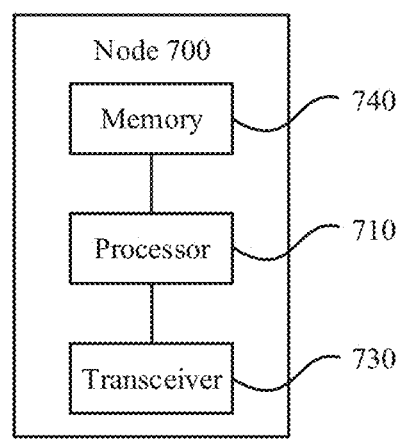
FIG. 7 is a schematic diagram of a structure of a node according to an example embodiment.

A node 700 may include a processor 710, a memory 740, and a transceiver 730. The transceiver 730 may be connected to the processor 710, as shown in FIG. 7. The transceiver 730 may include a receiver and a transmitter, and may be configured to receive or send a message or data. The transceiver 730 may be a network interface card. The node 700 may further include an acceleration component (which may also be referred as an accelerator). When the acceleration component is a network acceleration component, the acceleration component may be a network interface card. The processor 710 may be a control center of the node 700, and connects parts, such as the transceiver 730, of the whole node 700 by using various interfaces and lines. In this embodiment of this disclosure, the processor 710 may be a central processing unit (Central Processing Unit, CPU). Optionally, the processor 710 may include one or more processing units. The processor 710 may alternatively be a digital signal processor, an application-specific integrated circuit, a field programmable gate array or another programmable logic device, or the like. The node 700 may further include a memory 740. The memory 740 may be configured to store a software program and module. The processor 710 executes various function applications and data processing of the node 700 by reading software code or the software module stored in the memory.

A person skilled in the art can easily figure out another implementation solution of the disclosure after considering the specification and practicing the disclosure that is disclosed herein. This application is intended to cover any variations, functions, or adaptive changes of the disclosure. These variations, functions, or adaptive changes comply with general principles of the disclosure, and include common knowledge or a commonly used technical means in the technical field that is not disclosed in the disclosure. The specification and the embodiments are merely considered as examples, and the actual scope and the spirit of the disclosure are pointed out by the claims.

It should be understood that this disclosure is not limited to the accurate structures that are described in the foregoing and that are shown in the accompanying drawings, and modifications and changes may be made without departing from the scope of the disclosure. The scope of the disclosure is limited only by the appended claims.

What is claimed is:

1. A computer-implemented method, comprising:
   determining a first computation task type corresponding to a data packet;
   determining, based on a pre-obtained first correspondence between the first computation task type, nodes, and a computing performance corresponding to each of the nodes, wherein the computing performance corresponding to each of the nodes comprises a computation delay, at least one of the nodes corresponding to the first computation task type and a first computing performance corresponding to the at least one of the nodes;
   determining a target node from the at least one of the nodes based on the first computing performance corresponding to the at least one of the nodes and a link status between a local node and each of the at least one of the nodes;
   determining an address of the target node as a destination address of the data packet; and
   forwarding the data packet based on the destination address.

2. The method according to claim 1, wherein the link status comprises a data packet round-trip delay, and wherein determining the target node from the at least one of the nodes comprises:
   for each node of the nodes, determining a sum of a computation delay corresponding to the node and a data packet round-trip delay between the local node and the node; and
   determining, from the at least one of the nodes, a node corresponding to a smallest sum as the target node.

3. The method according to claim 1, comprising:
   when the local node is started, for each of the nodes, sending a computation task type query request to the at least one of the nodes;
   receiving at least one computation task type from the at least one of the nodes;
   sending a computing performance query request corresponding to the at least one computation task type to the at least one of the nodes;
   receiving a second computing performance that corresponds to the at least one computation task type; and
   establishing the pre-obtained first correspondence based on the second computing performance.

4. The method according to claim 3, wherein the at least one of the nodes and the local node belong to a same preset network area, and the second computing performance comprises current load information that corresponds to the at least one computation task type and a second computation delay, and
   wherein the method comprises:
      determining, based on a pre-stored second correspondence between the current load information and the second computation delay, a computation delay that corresponds to the current load information and the at least one computation task type.

5. The method according to claim 3, wherein the at least one of the nodes and the local node do not belong to a same preset network area, and wherein receiving the second computing performance that corresponds to the at least one computation task type comprises:
   receiving a computation delay that corresponds to the at least one computation task type.

6. The method according to claim 1, wherein the pre-obtained first correspondence comprises quantities of updates of the first computing performance, and wherein the method comprises:
   receiving a computing performance query request from at least one node of the nodes;
   obtaining a query computation task type and a corresponding quantity of updates that are carried in the computing performance query request, wherein the computing performance query request indicates to query a third computing performance of another node belonging to a same preset network area as the local node;
   determining, from the pre-obtained first correspondence, a quantity of updates of the third computing performance corresponding to the query computation task type; and
   in response to the quantity of updates of the third computing performance being greater than the corresponding quantity of updates that carried in the computing performance query request, sending the third computing performance and the quantity of updates of the third computing performance to the at least one node.

7. The method according to claim 6, comprising:
   receiving a target data packet whose destination address is the another node;
   determining a second computation task type corresponding to the target data packet;
   forwarding the target data packet to the another node;
   receiving a computation result that corresponds to the target data packet from the another node;
   determining a computation delay between a time point at which the target data packet is forwarded and a current time point;

determining the computation delay as a fourth computing performance corresponding to the second computation task type;

replacing, with the fourth computing performance corresponding to the second computation task type, a fifth computing performance that is in the pre-obtained first correspondence and corresponds to the second computation task type; and updating a quantity of updates of the fourth computing performance in the pre-obtained first correspondence.

8. A node, comprising at least one processor, one or more memories, and a transceiver, wherein the one or more memories are coupled to the at least one processor and store programming instructions for execution by the at least one processor to:

determine a first computation task type corresponding to a data packet;

determine, based on a pre-obtained first correspondence in the one or more memories, between the first computation task type, nodes, and a computing performance corresponding to each of the nodes, wherein the computing performance corresponding to each of the nodes comprises a computation delay, at least one of the nodes corresponding to the first computation task type and a first computing performance corresponding to the at least one of the nodes;

determine a target node from the at least one of the nodes based on the first computing performance corresponding to the at least one of the nodes and a link status between a local node and each of the at least one of the nodes; and determine an address of the target node as a destination address of the data packet; and wherein the transceiver is configured to:
forward the data packet based on the destination address.

9. The node according to claim 8, wherein the link status comprises a data packet round-trip delay, and wherein the one or more memories store programming instructions for execution by the at least one processor to:

for each node of the nodes, determine a sum of a computation delay corresponding to the node and a data packet round-trip delay between the local node and the node; and determine, from the at least one of the nodes, a node corresponding to a smallest sum as the target node.

10. The node according to claim 8, wherein the transceiver is configured to:

when the local node is started, for each of the nodes, send a computation task type query request to the at least one of the nodes;

receive at least one computation task type from the at least one of the nodes;

send a computing performance query request corresponding to the at least one computation task type to the at least one of the nodes;

receive a second computing performance that corresponds to the at least one computation task type; and wherein the processor is executed to:
establish the pre-obtained first correspondence based on the second computing performance.

11. The node according to claim 10, wherein the at least one of the nodes and the local node belong to a same preset network area, and the second computing performance comprises current load information that corresponds to the at least one computation task type and a second computation delay, and wherein the processor is executed to:

determine, based on a pre-stored second correspondence in the one or more memories, between the current load information and the second computation delay, a computation delay that corresponds to the current load information and the at least one computation task type.

12. The node according to claim 10, wherein the at least one of the nodes and the local node do not belong to a same preset network area, and wherein the transceiver is configured to:

receive a computation delay that corresponds to the at least one computation task type.

13. The node according to claim 8, wherein the pre-obtained first correspondence comprises quantities of updates of the first computing performance, and wherein the processor is executed to:

receive a computing performance query request from the node of the nodes;

obtain a query computation task type and a corresponding quantity of updates that are carried in the computing performance query request, wherein the computing performance query request indicates to query a third computing performance of another node belonging to a same preset network area as the local node; and determine, from the pre-obtained first correspondence, a quantity of updates of the third computing performance corresponding to the query computation task type; and wherein the transceiver is configured to:
in response to the quantity of updates of the third computing performance being greater than the corresponding quantity of updates that carried in the computing performance query request, send the third computing performance and the quantity of updates of the third computing performance to the node of the nodes.

14. The node according to claim 13, wherein the processor is executed to:

receive a target data packet whose destination address is the another node;

determine a second computation task type corresponding to the target data packet;

forward the target data packet to the another node;

receive a computation result that corresponds to the target data packet from the another node;

determine a computation delay between a time point at which the target data packet is forwarded and a current time point;

determine the computation delay as a fourth computing performance corresponding to the second computation task type;

replace, with the fourth computing performance corresponding to the second computation task type, a fifth computing performance that is in the pre-obtained first correspondence and corresponds to the second computation task type; and update a quantity of updates of the fourth computing performance in the pre-obtained first correspondence.

15. A non-transitory computer-readable storage medium storing programming instructions for execution by at least one processor of a node to:

receive a data packet;

determine a first computation task type corresponding to the data packet;

determine, based on a pre-obtained first correspondence between the first computation task type, nodes, and a computing performance corresponding to each of the nodes, wherein the computing performance corresponding to each of the nodes comprises a computation delay, at least one of the nodes corresponding to the first computation task type and a first computing performance corresponding to the at least one of the nodes;
determine a target node from the at least one of the nodes based on the first computing performance corresponding to the at least one of the nodes and a link status between a local node and each of the at least one of the nodes;
determine an address of the target node as a destination address of the data packet; and
forwarding the data packet based on the destination address.

16. The non-transitory computer-readable storage medium according to claim 15, wherein the link status comprises a data packet round-trip delay, and wherein the non-transitory computer-readable storage medium stores programming instructions for execution by the at least one processor to:
for each node of the nodes, determine a sum of a computation delay corresponding to the node and a data packet round-trip delay between the local node and the node; and
determine, from the at least one of the nodes, a node corresponding to a smallest sum as the target node.

17. The non-transitory computer-readable storage medium according to claim 15, wherein the non-transitory computer-readable storage medium stores programming instructions for execution by the at least one processor to:
establish a pre-obtained first correspondence between a computation task type, the other nodes, and computing performance based on at least one computation task type corresponding to each of the other nodes and based on a second computing performance corresponding to the at least one computation task type.

18. The non-transitory computer-readable storage medium according to claim 17, wherein the at least one of the nodes and the local node belong to a same preset network area, and the second computing performance comprises current load information that corresponds to the at least one computation task type and a second computation delay, and wherein the non-transitory computer-readable storage medium stores programming instructions for execution by the at least one processor to:
determine, based on a pre-stored second correspondence, between the current load information and the second computation delay, a computation delay that corresponds to the current load information and the at least one computation task type.

19. The non-transitory computer-readable storage medium according to claim 17, wherein the at least one of the nodes and the local node do not belong to a same preset network area.

20. The non-transitory computer-readable storage medium according to claim 15, wherein the pre-obtained first correspondence comprises quantities of updates of the first computing performance, and wherein the non-transitory computer-readable storage medium stores programming instructions for execution by the at least one processor to:
receive a computing performance query request from the node of the nodes;
obtain a query computation task type and a corresponding quantity of updates that are carried in the computing performance query request, wherein the computing performance query request indicates to query a third computing performance of another node belonging to a same preset network area as the local node; and
determine, from the pre-obtained first correspondence, a quantity of updates of the third computing performance corresponding to the query computation task type.

* * * * *